US006660952B2

(12) United States Patent
Hsu

(10) Patent No.: US 6,660,952 B2
(45) Date of Patent: Dec. 9, 2003

(54) SAFETY SWITCH FOR ELECTRONIC DEVICE

(75) Inventor: Hsin-An Hsu, Taipei (TW)

(73) Assignee: First International Computer, Inc., Taipei (TW)

( * ) Notice: Subject to any disclaimer, the term of this patent is extended or adjusted under 35 U.S.C. 154(b) by 0 days.

(21) Appl. No.: 10/309,267

(22) Filed: Dec. 4, 2002

(65) Prior Publication Data

US 2003/0173200 A1 Sep. 18, 2003

(30) Foreign Application Priority Data

Mar. 12, 2002 (TW) ...................................... 91202867 U

(51) Int. Cl.[7] ................................................ H01M 9/20

(52) U.S. Cl. ....................................... 200/334; 200/329

(58) Field of Search ................................ 200/334, 329, 200/293, 295, 303, 307, 296; 439/456, 457, 459; 192/116.5–150

(56) References Cited

U.S. PATENT DOCUMENTS 4,210,380 A * 7/1980 Brzostek ..................... 439/456
5,070,219 A * 12/1991 Grosskrueger et al. .. 200/43.08
5,244,415 A * 9/1993 Marsilio et al. ............ 439/610
5,329,083 A * 7/1994 Lai ......................... 200/302.2
5,533,911 A * 7/1996 Elam .......................... 439/459

* cited by examiner

*Primary Examiner*—Karl D. Easthom
*Assistant Examiner*—M. Fishman
(74) *Attorney, Agent, or Firm*—Bacon & Thomas, PLLC

(57) ABSTRACT

The present invention is to provide a safety switch in an electronic device comprising a seat having an opening and a trigger switch fitted in a cavity of the opening, wherein one end of a signal cable extended from the trigger switch is formed as a connector, and the signal cable sequentially run over two spaced apart cylinders disposed in the opening and passes through a gap on the bottom of the opening for exposing the connector outside the seat, such that, while a pulling force exerted on the signal cable, an additional support provided by the cylinders will prevent the pulling force from transmitting to the trigger switch along the signal cable to cause a disengagement of the trigger switch from the signal cable.

5 Claims, 3 Drawing Sheets

SAFETY SWITCH FOR ELECTRONIC DEVICE

FIELD OF THE INVENTION

The present invention relates to safety switches and more particularly to an improved safety switch adapted to be installed within an electronic device (e.g., computer) so as to inhibit the theft of internal electronic elements.

BACKGROUND OF THE INVENTION

Conventionally, a safety switch is installed within an electronic device (e.g., computer) for preventing its housing or the internal electronic elements installed therein from being opened or touched by an unauthorized third party as well as issuing a warning alarm by the electronic device if such unauthorized action is occurred. Typically, a connector at one end of a signal cable extended from a trigger switch of the safety switch is electrically coupled to one of the internal electronic elements of the electronic device. The safety switch is secured to the inner wall of the housing of the electronic device enabling the trigger switch to sense whether the housing is being opened. Therefore, the location of securing the safety switch to the inner wall of the housing is critical to success of its desired purposes. Recently, the importance of the safety switch is particularly significant because the current electronic elements are very delicate and even expensive. An unauthorized opening of the housing of the electronic device and a subsequent manipulation of its internal electronic elements by a third party may damage the electronic elements. Hence, the safety switch should be well designed in order to inhibit such unauthorized action.

As stated above, the configuration of the well known safety switch comprises a trigger switch, a signal cable, a connector at one end of the signal cable electrically coupled to one of internal electronic elements of the electronic device, which is secured to the inner wall of the housing of the electronic device for sensing an unauthorized opening of the housing of the electronic device and a subsequent manipulation of its internal electronic elements by a third party and issuing a warning signal by the electronic device to inhibit the unauthorized action.

However, the prior art safety switch suffered from several disadvantages. For example, any pulling action to the signal cable happened in the testing procedures in the manufacturing factory may cause a poor contact of the signal cable with the internal electronic element or the trigger switch, or even disengage the connector from the internal electronic element or the signal cable from the trigger switch. This will increase the number of defect products, resulting in an increase of both maintaining cost and time after selling. Unfortunately, it is frequently occurred in assembly and test procedures in the manufacturing process. To the worse, the connector of the safety switch may be disengaged from the internal electronic element due to an inadvertent pulling in maintenance of the electronic device in the future. This can bring inconvenience to users.

Thus, it is desirable to provide an improved safety switch installed within an electronic device in order to overcome the above drawbacks of the prior art.

SUMMARY OF THE INVENTION

A primary object of the present invention is to provide a safety switch in an electronic device comprising a seat comprising an opening, a cavity in the opening, a first cylinder in the opening, a second cylinder in the opening, and at least one snapping member at either edge of the opening so as to fasten the seat to an inner wall of a housing of the electronic device. With this arrangement, the present invention can prevent the housing from being opened and prevent internal electronic elements of the electronic device from being touched by an unauthorized third party as well as issuing a warning signal by the the electronic device. The seat further comprises a gap on the bottom of the opening. The second cylinder is spaced apart from the first cylinder. The safety switch further comprises a trigger switch fitted in the cavity of the opening, the trigger switch comprising a signal cable extended therefrom wherein one end of the signal cable is formed as a connector, the signal cable runs the lower surface of the first cylinder prior to going up to run the upper surface of the second cylinder, and the signal cable passes through the gap on the bottom of the opening for exposing the connector. An additional support is provided to the signal cable by both the first and second cylinders as a pulling force is exerted on the signal cable for preventing the pulling force from transmitting to the trigger switch along the signal cable to cause a poor contact of the trigger switch with the signal cable or a disengagement of the trigger switch from the signal cable. By utilizing this safety switch, it is possible of overcoming the above drawbacks of the prior art, i.e., a pulling of the signal cable causes a poor contact of the trigger switch with the signal cable or even disengages the trigger switch from the signal cable and an increase of the number of defect products.

The above and other objects, features and advantages of the present invention will become apparent from the following detailed description taken with the accompanying drawings.

DETAILED DESCRIPTION OF THE PREFERRED EMBODIMENTS

As known that a conventional safety switch mounted in an electronic device has the following drawbacks. For example, a pulling of the signal cable causes a poor contact of the trigger switch with the signal cable or even disengages the trigger switch from the signal cable and results in increasing the number of defect products.

Figure 1:
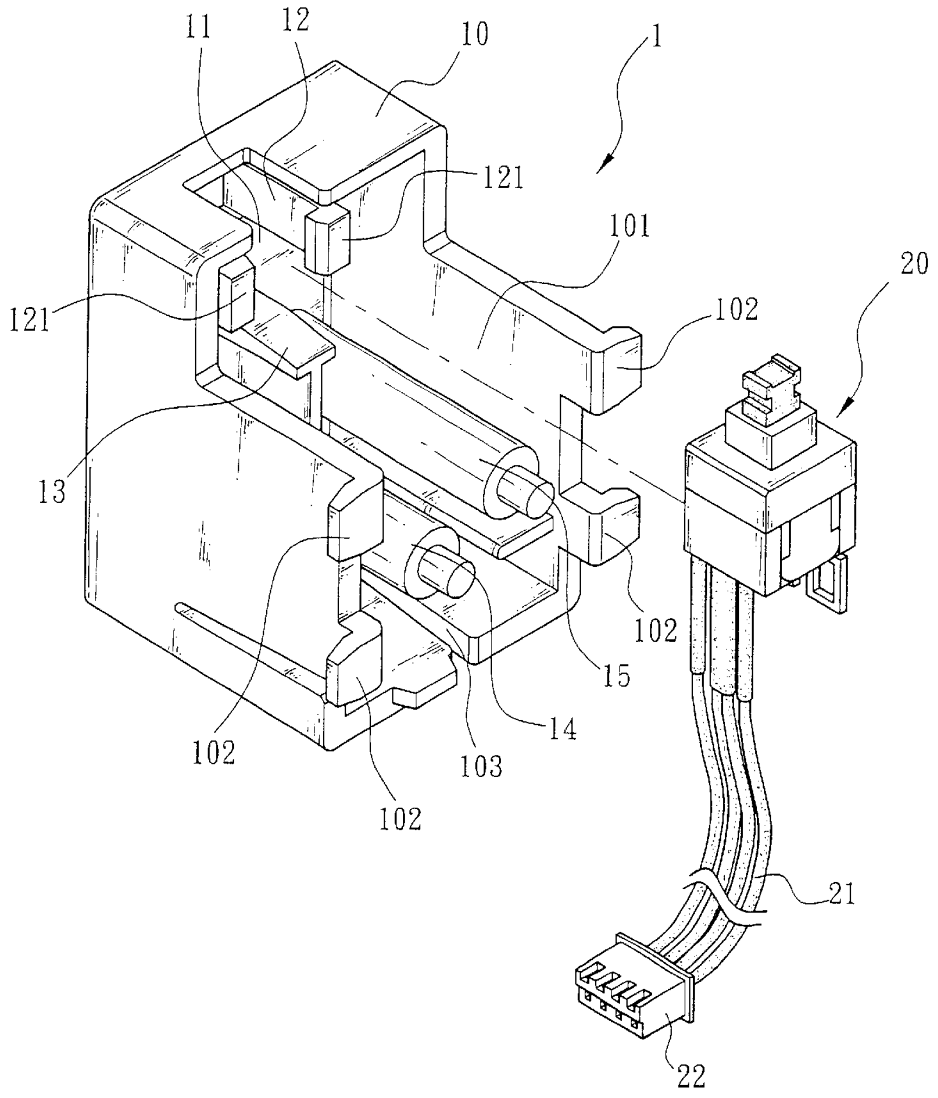
FIG. 1 is an exploded view of a preferred embodiment of safety switch according to the invention.
Figure 2:
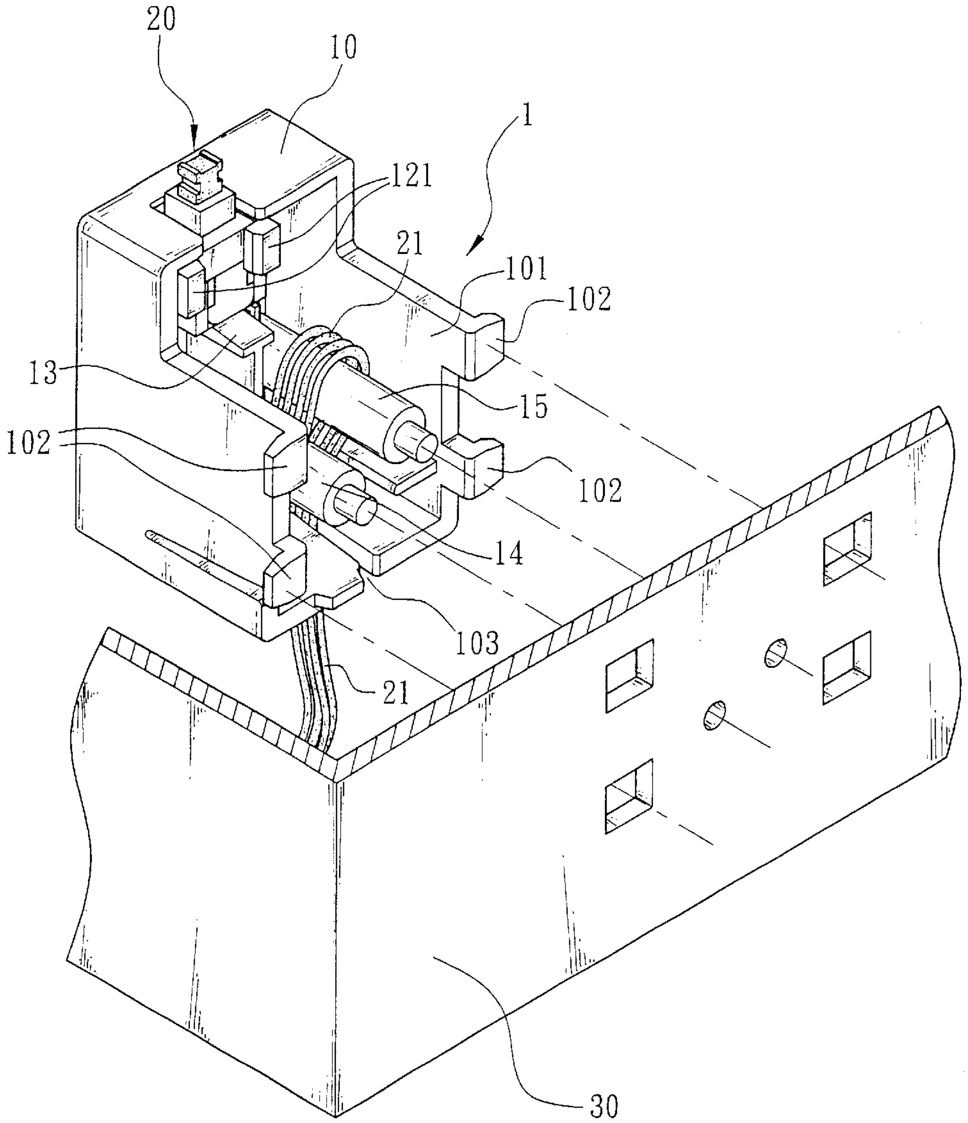
FIG. 2 is a perspective view of the assembled safety switch being adapted to be mounted in a computer.
Figure 3:
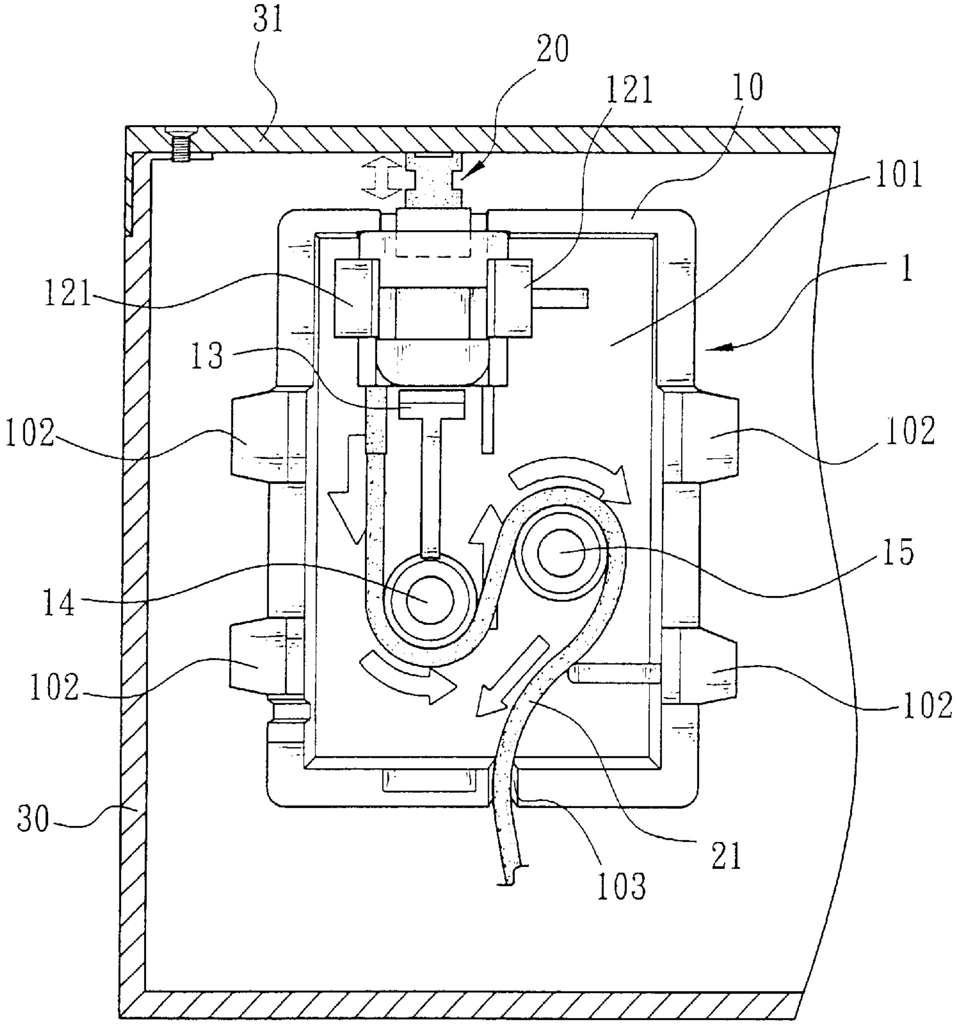
FIG. 3 is a cross-sectional view of the safety switch showing a pulling of a coupled signal cable.

The invention is thus directed to a novel safety switch adapted to be installed in an electronic device. The safety switch does not have any of the above drawbacks of the prior art, i.e., a pulling of the signal cable causes a poor contact of the trigger switch with the signal cable or even disengages the trigger switch from the signal cable and an increase of the number of defect products. Referring to FIGS. 1 to 3, there is shown a safety switch 1 in accordance with the invention. The safety switch 1 is located in an electronic device. The safety switch 1 comprises a hollow seat 10. The seat 10 can be formed as one of a variety of shapes. The seat 10 comprises an opening 101 at one side and at least one snapping member (two are shown) 102 at either edge of the opening 101. The provision of snapping members 102 can facilitate a fastening of the seat 10 to an inner wall of housing of the electronic device. In the embodiment, the snapping members 102 are secured to housing 30 of the electronic device (e.g., computer).

In the invention, a cavity 11 is formed within the opening 101. The cavity 11 is defined by two opposite arms 12 and a base 13 between the arms 12. A latch member 121 is formed at the open end of the arm 12. The provision of latch members 121 can facilitate a fastening of the arms 12 to a member as detailed later.

Moreover, within the opening 101 there are further provided a first cylinder 14 and a spaced second cylinder 15. In the embodiment, in the opening 101 the first cylinder 14 is located below the base 13 while the second cylinder 15 is slightly higher than the first cylinder 14. A gap 103 is formed on the bottom of the opening 101.

In the invention, a trigger switch 20 is fitted in the cavity 11 of the opening 101. The trigger switch 20 comprises a signal cable 21 extended therefrom. One end of the signal cable 21 is formed as a connector 22. The signal cable 21 runs the lower surface of the first cylinder 14 prior to going up to run the upper surface of the second cylinder 15. Finally, the signal cable 21 passes through the gap 103 on the bottom of the opening 101 so as to expose the connector 22 outside the seat 10. As such, an additional support is provided to the signal cable 21 by both the first and second cylinders 14 and 15 as a pulling force is exerted on the signal cable 21. This can prevent the pulling force from transmitting to the trigger switch 20 along the signal cable 21. Otherwise, it may cause a poor contact of the trigger switch 20 with the signal cable 21 or even a disengagement of the trigger switch 20 from the signal cable 21.

With such configuration, the seat 10 can be reliably fastened at an inner wall of the computer housing 30 as implemented by the invention in which the trigger switch 20 is in contact with the underside of the top 31 of the computer housing 30. Also, the connector 22 is electrically coupled to one of internal electronic elements (not shown) of the electronic device. With the provision of the safety switch 1, in case of an unauthorized opening of the computer housing 30, the trigger switch 20 is enabled to generate a signal which is in turn sent to one of the internal electronic elements. An appropriate warning is then issued by the internal electronic element for inhibiting the unauthorized action. In brief, the invention can prevent the computer housing 30 from being opened and prevent the internal electronic elements from being touched by an unauthorized third party by issuing a warning alarm or the like. Further, the invention can greatly eliminate the possibility of poor contact of the trigger switch with the signal cable or even disengagement of the trigger switch from the signal cable caused by pulling the well known safety switch.

While the invention has been described by means of specific embodiments, numerous modifications and variations could be made thereto by those skilled in the art without departing from the scope and spirit of the invention set forth in the claims.

What is claimed is:

1. A safety switch mounted in an electronic device comprising:

a seat having one of a variety of shapes, the seat comprising an opening at one side, at least one snapping member at either edge of the opening so as to fasten the seat to a predetermined position of the electronic device, and a gap on the bottom of the opening;

a cavity provided in the opening;

a first cylinder provided in the opening;

a second cylinder provided in the opening and spaced apart from the first cylinder; and a trigger switch fitted in the cavity of the opening, the trigger switch comprising a signal cable extended therefrom wherein one end of the signal cable is formed as a connector, the signal cable runs the lower surface of the first cylinder prior to going up to run the upper surface of the second cylinder, and the signal cable passes through the gap on the bottom of the opening for exposing the connector, whereby an additional support is provided to the signal cable by both the first and second cylinders as a pulling force is exerted on the signal cable for preventing the pulling force from transmitting to the trigger switch along the signal cable to cause a poor contact of the trigger switch with the signal cable or a disengagement of the trigger switch from the signal cable.

2. The safety switch of claim 1, wherein the predetermined position of fastening the seat to the electronic device is an inner wall of a housing of the electronic device.

3. The safety switch of claim 1, further comprising two opposite arms and a base between the arms for defining the cavity.

4. The safety switch of claim 3, further comprising a latch member formed at the open end of each of the arms for securing to a predetermined member.

5. The safety switch of claim 1, wherein the first cylinder is located below the base in the cavity and the second cylinder is higher than the first cylinder by a predetermined distance.

* * * * *